United States Patent
Jabusch et al.

(10) Patent No.: US 10,793,104 B2
(45) Date of Patent: Oct. 6, 2020

(54) VEHICLE-SENSITIVE SENSOR WITH MULTI-PART SENSOR MASS

(71) Applicant: AUTOLIV DEVELOPMENT AB, Vargarda (SE)

(72) Inventors: Ronald Jabusch, Elmshorn (DE); Uwe Evers, Glückstadt (DE); Aniruddha Deshpande, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/761,967

(22) PCT Filed: Sep. 21, 2016

(86) PCT No.: PCT/EP2016/072354
§ 371 (c)(1),
(2) Date: Mar. 21, 2018

(87) PCT Pub. No.: WO2017/050794
PCT Pub. Date: Mar. 30, 2017

(65) Prior Publication Data
US 2018/0272989 A1 Sep. 27, 2018

(30) Foreign Application Priority Data
Sep. 24, 2015 (DE) .......................... 10 2015 116 136

(51) Int. Cl.
*B60R 22/40* (2006.01)
(52) U.S. Cl.
CPC .................................. *B60R 22/40* (2013.01)

(58) Field of Classification Search
CPC ....... B60R 22/40; B60R 22/405; B60R 22/415; B60R 2022/401
(Continued)

(56) References Cited

U.S. PATENT DOCUMENTS

| 3,758,044 A | 9/1973 | Nilsson |
| 3,901,459 A | 8/1975 | Romanzi et al. |

(Continued)

FOREIGN PATENT DOCUMENTS

| DE | 27 36 025 A1 | 2/1978 |
| DE | 80 09 960 U1 | 8/1980 |

(Continued)

OTHER PUBLICATIONS

International Search Report of PCT/EP2016/072354, dated Nov. 30, 2016 (English translation).

*Primary Examiner* — Frank B Vanaman
(74) *Attorney, Agent, or Firm* — Dickinson Wright PLLC

(57) ABSTRACT

A vehicle-sensitive sensor for a self-locking belt retractor, including a carrier part (4), a locking lever (2) including an engagement point (3), and a sensor mass (1) coupled to the locking lever (2), disposed as standing upright on a supporting face (5) of the carrier part (4) and tiltable with respect to the carrier part (4) The sensor mass (1) includes a sensor part (6), made of a first material, resting on the supporting face (5), and of a mass part (7), made of a second material, connected to the sensor part (6), disposed above the supporting face (5), wherein the first material forming the sensor part (6) has a lower density and a lesser hardness than the second material forming the mass part (7).

14 Claims, 4 Drawing Sheets

(58) Field of Classification Search
USPC .......................................................... 280/806
See application file for complete search history.

(56) References Cited

U.S. PATENT DOCUMENTS

| | | | |
|---|---|---|---|
| 3,926,384 A | 12/1975 | Weman | |
| 4,135,410 A | 1/1979 | Filderman | |
| 4,135,683 A | 1/1979 | Stephenson et al. | |
| 4,164,336 A | 8/1979 | Higbee et al. | |
| 4,262,858 A | 4/1981 | Takada | |
| 4,314,680 A | 2/1982 | Takada | |
| 4,391,420 A | 7/1983 | Ahad et al. | |
| 4,399,955 A | 8/1983 | Miskowicz et al. | |
| 4,534,521 A | 8/1985 | Sylven | |
| 4,898,033 A * | 2/1990 | Yamamoto | B60R 22/40 |
| | | | 242/384.6 |
| 4,915,411 A | 4/1990 | Norton | |
| 5,443,224 A | 8/1995 | Patterson et al. | |
| 5,568,941 A * | 10/1996 | Woydick | B60R 22/405 |
| | | | 242/384.6 |
| 5,622,327 A | 4/1997 | Heath et al. | |
| 5,716,102 A * | 2/1998 | Ray | B60R 22/26 |
| | | | 242/384.4 |
| 5,950,952 A | 9/1999 | Koketsu | |
| 6,164,581 A | 12/2000 | Freeman et al. | |
| 6,230,997 B1 | 5/2001 | Palliser | |
| 6,386,472 B1 | 5/2002 | Rogers, Jr. | |
| 7,013,736 B2 | 3/2006 | Knox | |
| 7,300,013 B2 * | 11/2007 | Morgan | B29C 45/14065 |
| | | | 242/384.4 |
| 7,416,150 B2 | 8/2008 | Morgan et al. | |
| 7,628,349 B2 | 12/2009 | Clute et al. | |
| 8,770,507 B2 | 7/2014 | Evers et al. | |
| 9,409,547 B2 | 8/2016 | Baumgartner et al. | |
| 2003/0234310 A1 * | 12/2003 | Kielwein | B60R 22/40 |
| | | | 242/384.6 |
| 2006/0243846 A1 | 11/2006 | Clute | |
| 2008/0029635 A1 | 2/2008 | Morgan et al. | |
| 2008/0217458 A1 * | 9/2008 | Clute | B60R 22/40 |
| | | | 242/384.6 |
| 2010/0193622 A1 * | 8/2010 | Ono | B60R 22/40 |
| | | | 242/384 |
| 2012/0104138 A1 * | 5/2012 | Lee | B60R 22/40 |
| | | | 242/384.2 |
| 2013/0241187 A1 * | 9/2013 | Baumgartner | B60R 22/40 |
| | | | 280/806 |

FOREIGN PATENT DOCUMENTS

| | | |
|---|---|---|
| DE | 195 39 619 A1 | 4/1997 |
| DE | 10 2004 016 501 A1 | 3/2005 |
| DE | 10 2009 052 495 A1 | 6/2011 |
| DE | 10 2011 086 656 A1 | 5/2012 |
| EP | 0 795 447 A2 | 9/1997 |

* cited by examiner

VEHICLE-SENSITIVE SENSOR WITH MULTI-PART SENSOR MASS

CROSS-REFERENCE TO RELATED APPLICATIONS

This application is a 35 U.S.C. § 371 national phase application of PCT International Application No. PCT/EP2016/072354, filed Sep. 21, 2016, which claims the benefit of priority under 35 U.S.C. § 119 to German Patent Application No. 10 2015 116 136.2, filed Sep. 24, 2015, the contents of which are incorporated herein by reference in their entirety.

FIELD OF THE INVENTION

The present invention relates to a vehicle-sensitive sensor for a self-locking belt retractor, including a carrier part, a locking lever including an engagement point and a sensor mass coupled to the locking lever, disposed as standing upright on a supporting face of the carrier part and is tippable with respect to the carrier part.

BACKGROUND

A sensor with the above-stated features is known from DE 195 39 619 C2. A sensor of this kind is employed in a locking system for a belt retractor shaft of a self-locking belt retractor, wherein when triggered, the vehicle-sensitive, supported sensor mass moves the locking lever with its engagement point into engagement with a toothed gear of a control disk, so that the control disk is stopped in its common rotational movement with the belt retractor shaft, and the locking system is thereby activated. It has been shown that the vehicle-sensitive sensor produces unwanted noises during the movement of a motor vehicle. In document DE 195 39 619 C2 it is proposed that the individual functional elements of the sensor be produced from soft, rubber-type or plastic-type materials to reduce noise generation, but the disadvantage therein is that a sensor mass thus formed requires a relatively complicated and large geometry in order to tilt onto the supporting face during a vehicle acceleration. In addition, it has been shown that with the known sensor the locking lever does not securely remain in the sensor in drop tests. In addition, contamination of the supporting face may occur, which prevents the sensor mass from tilting in one direction.

Therefore, the object of the present invention is to solve, at least in part, the problems described in the prior art, and in particular to specify a vehicle-sensitive sensor whose noise emission is reduced, which dependably tilts in all directions even after longer use and/or is still operational after drop tests.

SUMMARY AND INTRODUCTORY DESCRIPTION

At least one aspect of this problem is solved by a sensor with the features of the described embodiments. Advantageous further developments of the sensor are specified in the description, wherein individual features of the advantageous further developments can be combined with each other in any technologically meaningful manner.

At least one aspect of this problem is solved by a vehicle-sensitive sensor with the features named above, wherein the sensor mass includes a sensor part made of a first material resting on the supporting face, and of a mass part made of a second material connected to the sensor part, in particular with interference-fit, disposed above the supporting face, wherein the first material forming the sensor part has a lower density and a lesser hardness than the second material forming the mass part.

Thus a feature of the invention provides that the sensor mass includes different materials, wherein those regions of the sensor mass which when in use can come into contact with the carrier part, especially with the supporting face of the carrier part, includes a relatively soft and light material. Since softer material absorbs vibrations when in contact with other objects, the sound emissions can be reduced. The mass part disposed above the supporting face and having a greater density ensures that the sensor mass tilts dependably onto the supporting face during vehicle accelerations, in spite of its relatively small volume. Thus the sensor mass can have a relatively small volume while avoiding the emission of noise.

The vehicle-sensitive sensor can be affixed to a self-locking belt retractor by use of the carrier part. The carrier part forms an in particular flat supporting face, wherein the supporting face and the part of the sensor mass to be placed upon the supporting face are designed such that with a horizontal alignment of the sensor the sensor mass stands upright on the supporting face and such that even with slight accelerations it tilts in any direction on the supporting face. The sensor mass herein is coupled to the locking lever so that with tilting of the sensor mass the locking lever is deflected and can be brought into engagement with a control disk.

Preferably, the first material is a soft plastic, and the second material is a hard plastic. Alternatively the second material can be a metal. In particular it is also possible that the sensor mass is produced in a two-component ("two shot") injection molding process. Alternatively it can be provided that the sensor part and the mass part are produced independently from each other and are subsequently joined together. In this case the sensor part is connected to the mass part, in particular in an interference-fit manner.

In order to prevent the locking lever from detaching from the sensor in drop tests, in particular also independently of the solution described above the invention can provide that the locking lever engages through the sensor mass and is at least partly overlapped by a section of the carrier part on a side located opposite the engagement point, so that the sensor mass is secured against falling out. Thus the side of the locking lever including the engagement point protrudes past the sensor mass and secondly, the opposing side thereof protrudes past the sensor mass. The carrier part is designed in the part located opposite the engagement point such that it at least partly surrounds the locking lever on all sides in a cross-sectional plane. However, the locking lever in its position at rest is not in contact with the carrier part in all regions. Rather, a spacing is formed between the locking lever and the overlapping region of the carrier part, so that the locking lever can pivot out when the sensor mass is tilted. The spacing is dimensioned such that in the case of large deflections of the vehicle-sensitive sensor, the locking lever is prevented from dropping out of the sensor.

In particular, to form a tilt axis, the locking lever preferably rests between the supporting face of the carrier part and the engagement point of the locking lever on the carrier part, wherein the carrier part at least partly overlaps the locking lever also in the region of this contact. Also in this (cross-sectional) region, a spacing is formed between the overlapping region of the carrier part and the locking lever, so that the locking lever can be deflected when tilting the sensor mass. Especially when the carrier part overlaps the locking lever on both sides of the sensor mass, the locking lever is prevented from detaching from the sensor.

In particular it is also provided that a section of the locking lever extending through the sensor mass is in contact with the sensor mass along its tilting side and along its underside and has a spherical shape in the contact regions. In particular, the locking lever overlaps the sensor mass above the supporting face. Due to this kind of configuration, it is achieved that when the sensor mass is tilted on the supporting face, the locking lever is lifted in the region of its contact with the sensor mass, so that the locking lever is deflected and its engagement point is brought into engagement with the control disk. Due to the spherical-shaped design of the contact regions, this deflection is possible in a zero-clearance manner.

In this context it can be provided in particular that the extending section of the locking lever is disposed at least in sections between the one-part sensor part and the one-part mass part. This is used in particular when the locking lever is affixed to the sensor during the assembly by interference-fit connecting of the mass part to the sensor part.

For an interference-fit fixing of the mass part to the sensor part, it can be provided in particular that at least one notch is formed on the mass part, into which the ends of the hooks of the spring arms formed on the sensor part engage. Thus a simple snap-connection can be established between the mass part and sensor part.

In a further embodiment it can be provided that the locking lever extends through the single-part sensor part through a window-like recess in the sensor part and is in contact with the sensor part along its top side and its bottom side. With this kind of design, firstly the sensor part and the locking part can be mounted to the carrier part, while the mass part can be attached only subsequently.

With this kind of configuration in particular, it can be provided that the mass part is in particular a metallic sphere which snaps into the sensor part.

To prevent contamination from arriving upon the supporting face of the carrier part and thereby preventing the tilting motion of the sensor mass, independently of the solutions described above, it can be provided that a projecting region of the sensor mass extends through an outer edge of the supporting face, so that the supporting face is also covered radially by the sensor mass and thus is protected from contaminants. Thus the in particular flat supporting face is bounded radially by an edge which is overlapped by the projecting region of the sensor mass. Thus in a radial view, the edge of the supporting face would be covered by the projecting region of the sensor mass.

In order to limit a tilting motion of the sensor mass during vehicle acceleration, it can be provided that a rod-shaped protrusion of the sensor part is disposed in a cavity in the carrier part extending conical to the supporting face. Thus during a tipping motion of the sensor mass, the rod-shaped protrusion comes into contact with the perimeter surface of the cavity and thus limits the tilting motion. In particular, the rod-shaped protrusion can be dimensioned such that after cessation of the vehicle acceleration, it will ensure that the sensor mass again moves into its at-rest position.

The features mentioned above are also achieved by a self-locking belt retractor with a blocking system for a belt retractor shaft including a vehicle-sensitive sensor, wherein in the triggered state the vehicle-sensitive, supported sensor mass moves the locking lever by its engagement point into engagement with a toothed gear of a control disk, such that the control disk is stopped in its common rotational motion with the belt retractor shaft and the locking system is thereby activated.

The invention and its technical environment are explained below based on the exemplary embodiments.

DETAILED DESCRIPTION

Figure 1:
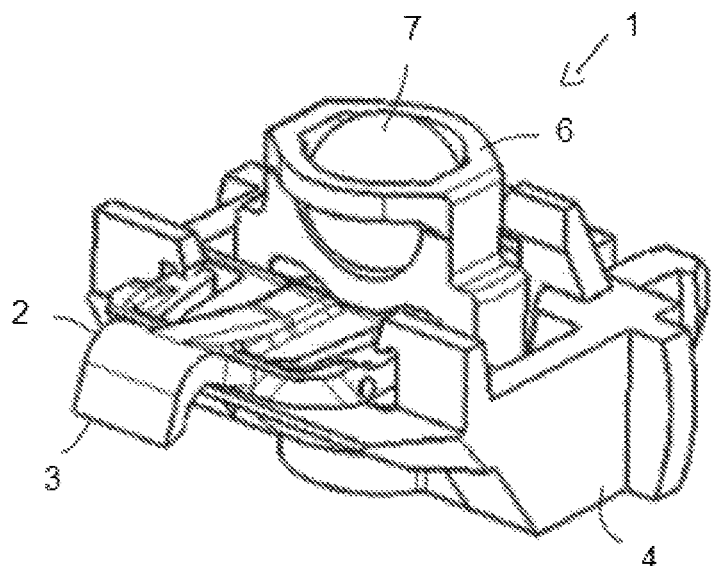
FIG. 1 schematically depicts a first embodiment of a vehicle-sensitive sensor.
Figure 2:
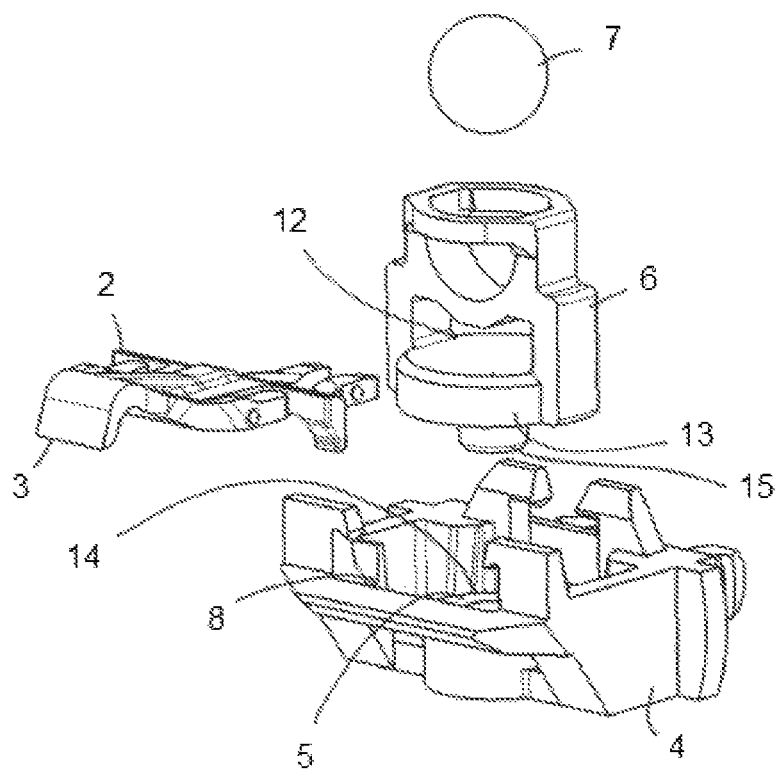
FIG. 2 schematically depicts an exploded view of the sensor.

FIGS. 1 to 4 depict a first embodiment of a vehicle-sensitive sensor. The vehicle-sensitive sensor includes a carrier part 4, with which the sensor can be secured to a self-locking belt retractor. The sensor further includes a locking lever 2 with an engagement point 3 which rests against supports 8 on the carrier part 4. The sensor further includes a sensor mass 1 composed of a sensor part 6 and a mass part 7. In the first exemplary embodiment, the mass part 7 is designed as spherical and is fixed in an interference-fit manner in a corresponding recess in the sensor part 6.

Figure 3:
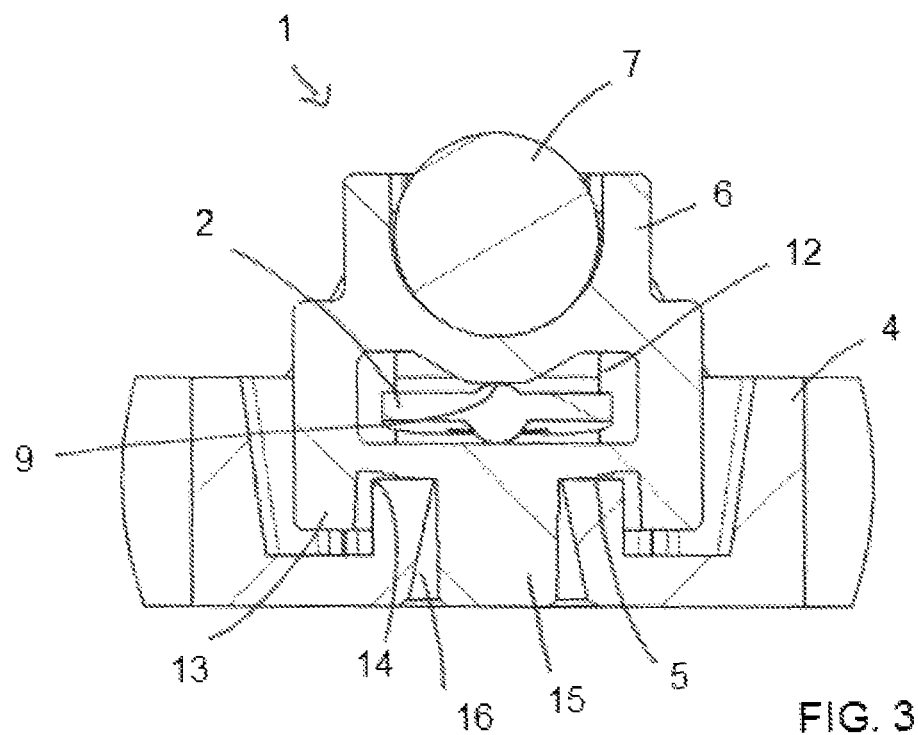
FIG. 3 schematically depicts a cross-sectional view through the sensor obliquely to a locking lever, FIG. 4 schematically depicts a cross-sectional view through the sensor along the locking lever, FIG. 5 schematically depicts a second embodiment of a sensor, FIG. 6 schematically depicts an exploded view of the second embodiment of the sensor, FIG. 7 schematically depicts a cross-sectional view through the sensor diagonal to a locking lever, and FIG. 8 schematically depicts a cross-sectional view through the sensor longitudinal to the locking lever.
Figure 4:
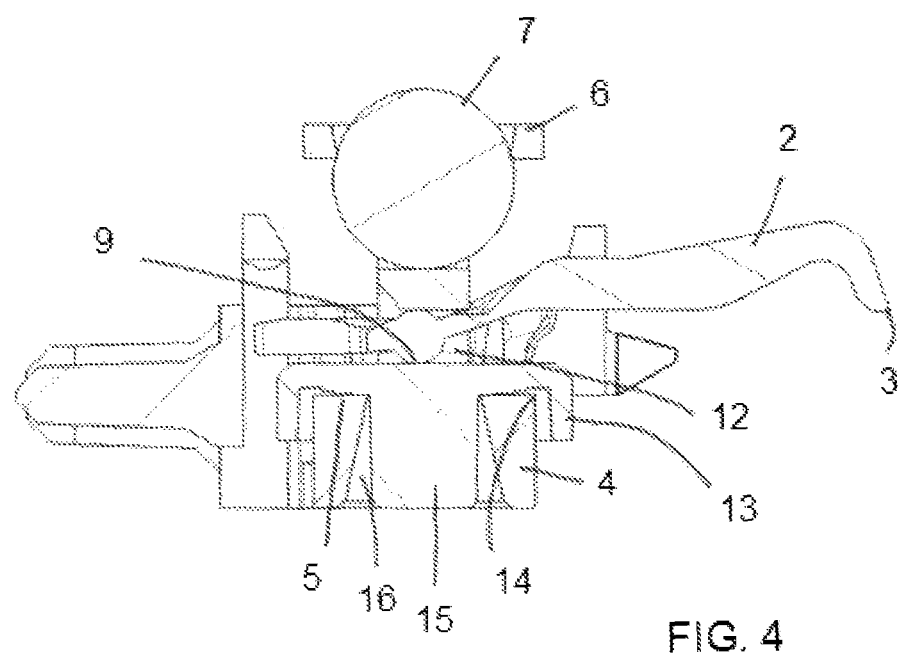
Figure 5:
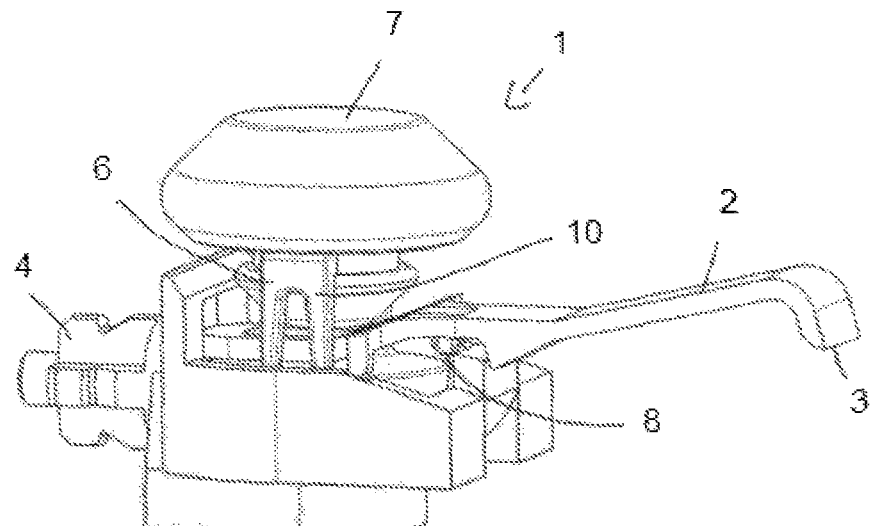
Figure 6:
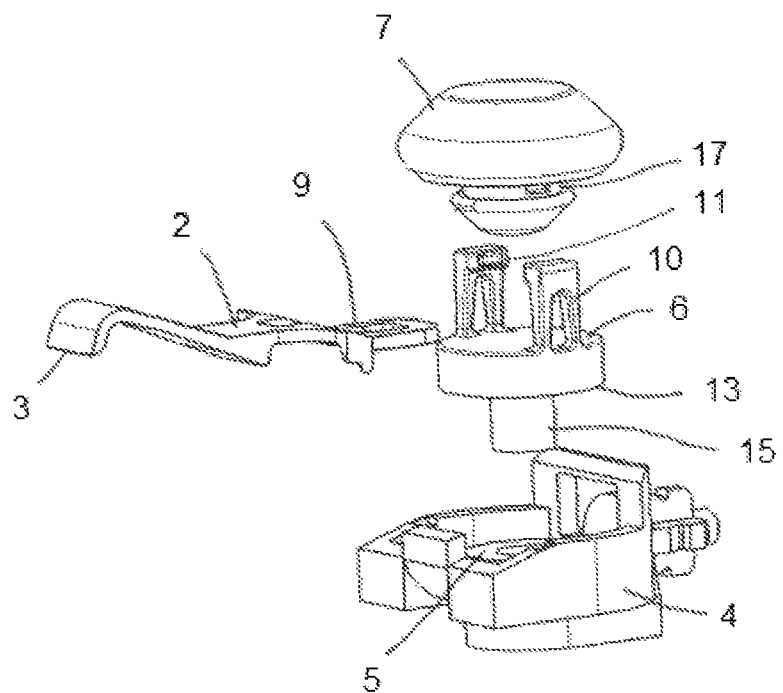
Figure 7:
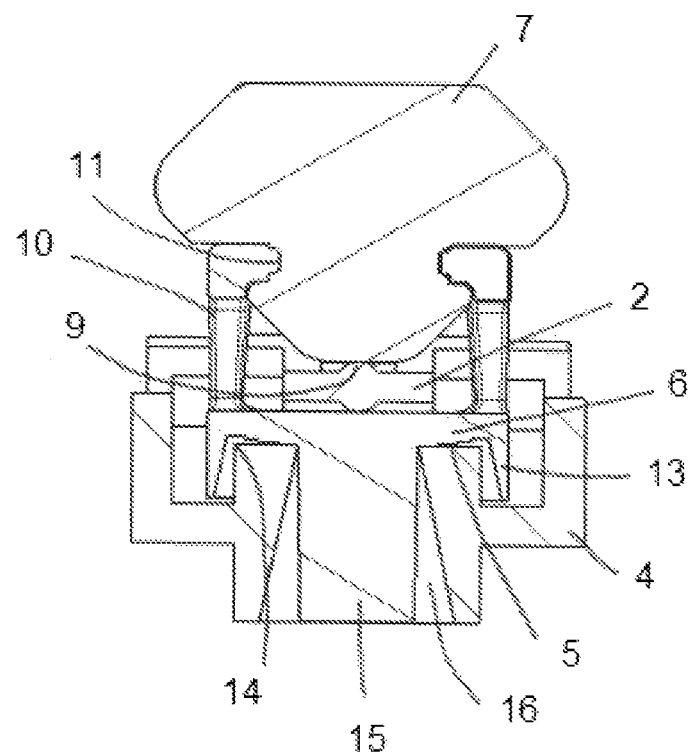
Figure 8:
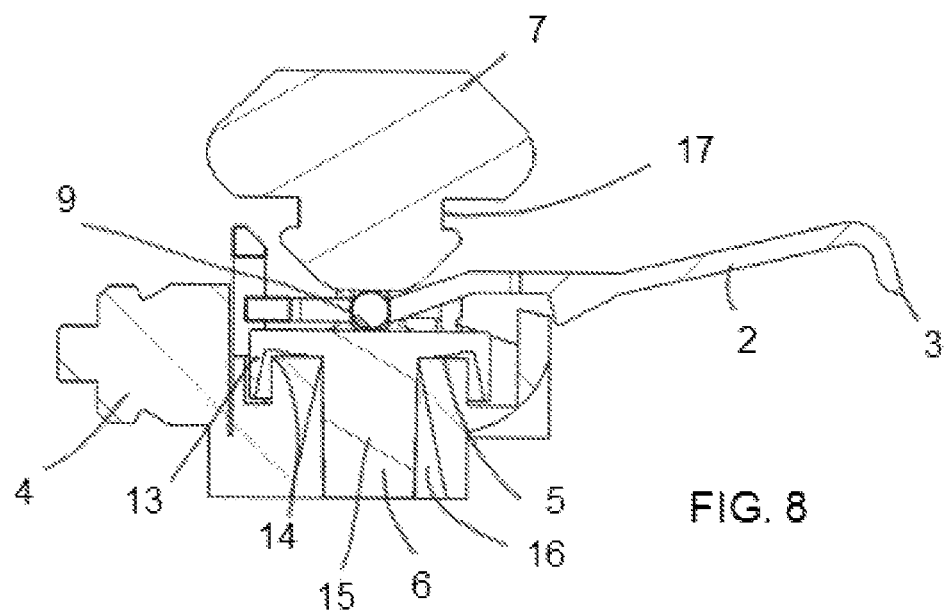

As is evident especially in FIG. 3 and FIG. 4, the sensor mass 1 with the sensor part 6 is standing upright on a supporting face 5 formed by the carrier part 4. A projecting region 13 of the carrier part 4 radially and axially overlaps an outer edge 14 of the supporting face 5. In addition, the sensor part 6 includes a protrusion 15 by which it is disposed in a recess 16 extending conically with respect to the supporting face.

The locking lever 2 resting upon the supports 8 also passes through a window-type recess 12 in the sensor part 6. In this extended region the contact regions 9 on the top side and along the underside of the locking lever 2 are in contact with the sensor part 6, wherein the contact regions 9 have a spherical shape. As is indicated in particular in FIG. 4, the carrier 4 firstly overlaps the locking lever 2 on a side facing the engagement point 3, and additionally on the opposing side, so that the locking lever 2 is secured against falling out.

Since the material of the sensor part 6 is softer than the material of the mass part 7, and thus all regions of the sensor mass 1 which can come into contact with other components are made of a soft material, rattling noises can be reduced. Since the projecting region 13 of the sensor part 6 overlaps the outer edge 14 of the supporting face 5, additionally any contamination adversely affecting the tilting motion of the sensor mass 1 is prevented.

In FIGS. 5 to 8, an additional embodiment of the vehicle-sensitive sensor is depicted, wherein only the differences to the first embodiment will be discussed below. In the second embodiment the sensor mass 1 is comprised of a mushroom-shaped mass part 7 with a perimeter notch 17 into which hooks 11 on spring arms 10 formed on the sensor part 6 engage. The locking lever 2 overlapping the sensor mass 1 is thus in contact on its top side with the mass part 7, and on its underside with the sensor part 6, and during the assembly can be secured in position by the interference-fit connection between mass part 7 and sensor part 6.

While the above description constitutes the preferred embodiment of the present invention, it will be appreciated that the invention is susceptible to modification, variation and change without departing from the proper scope and fair meaning of the accompanying claims.

The invention claimed is:

1. A vehicle-sensitive sensor for a self-locking belt retractor, comprising, a carrier part, a locking lever having an engagement point, and a sensor mass coupled to the locking lever, arranged standing upright on a supporting face of the carrier part and tiltable with respect to the carrier part, the sensor mass is comprised of a sensor part, made of a first material, resting on the supporting face, and of a mass part, made of a second material, connected to the sensor part, disposed above the supporting face, wherein the first material forming the sensor part has a lower density and a lesser hardness than the second material forming the mass part, the locking lever extending through a window recess formed by the sensor part wherein a portion of the locking lever is positioned on a side located opposite the engagement point, so that the sensor mass is secured.

2. A sensor according to claim 1, further comprising, the locking lever rests upon the carrier part to form a tilt axis, and the carrier part at least partly overlaps the locking lever in a region of support provided by the supporting face.

3. A sensor according to claim 1, further comprising, a section of the locking lever extending through the sensor part is in contact with the sensor part at a first contact region of the locking lever along a top side of the locking lever and at a second contact region of the locking lever along an underside of the locking lever, the first and the second contact regions each forming a spherical shape in contact with the sensor part.

4. A sensor according to claim 3, further comprising, the section of the locking lever extending through the window recess is arranged between a portion of the sensor part and the mass part.

5. A sensor according to claim 4, further comprising, the locking lever protruding from opposing lateral sides of the window recess.

6. A sensor according to claim 3, further comprising, both the first and the second contact regions of the locking lever are in contact with the sensor part.

7. A sensor according to claim 1, further comprising, at least one notch is formed on the mass part, into which an end of a hook of a spring arm formed on the sensor part engages.

8. A sensor according to claim 1, further comprising, the mass part is a sphere which snaps into the sensor part.

9. A sensor according to claim 1, further comprising, a projecting region of the sensor mass extends radially beyond an outer edge of the supporting face, so that the supporting face is covered radially by the sensor mass for providing protection from contaminants.

10. A sensor according to claim 9, further comprising, the projecting region of the sensor mass further extends axially beyond an outer edge of the supporting face, so that the supporting face is covered radially and axially by the sensor mass for providing protection from contaminants.

11. A sensor according to claim 1, further comprising, a protrusion of the sensor part is disposed in a recess in the carrier part extending to form a conical surface.

12. A vehicle-sensitive sensor according to claim 1, adapted to be incorporated in a self-locking belt retractor with a blocking system for a belt retractor shaft, wherein in a triggered state the vehicle-sensitive sensor mass moves the locking lever by the engagement point into engagement with the blocking system.

13. A sensor according to claim 1, further comprising, wherein the first material is a soft plastic and the second material is a hard plastic or a metal.

14. A sensor according to claim 1, further comprising, wherein the sensor part and the mass part fit together in an interference fit manner.

\* \* \* \* \*